United States Patent
Zhang et al.

(10) Patent No.: US 11,605,372 B2
(45) Date of Patent: Mar. 14, 2023

(54) TIME-BASED FREQUENCY TUNING OF ANALOG-TO-INFORMATION FEATURE EXTRACTION

(71) Applicant: TEXAS INSTRUMENTS INCORPORATED, Dallas, TX (US)

(72) Inventors: Zhenyong Zhang, San Jose, CA (US); Wei Ma, San Ramon, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/702,253

(22) Filed: Mar. 23, 2022

(65) Prior Publication Data

US 2022/0215829 A1 Jul. 7, 2022

Related U.S. Application Data

(63) Continuation of application No. 16/452,760, filed on Jun. 26, 2019, now Pat. No. 11,302,306, which is a
(Continued)

(51) Int. Cl.
*G10L 15/02* (2006.01)
*G10L 21/0264* (2013.01)
(Continued)

(52) U.S. Cl.
CPC .............. *G10L 15/02* (2013.01); *G10L 15/22* (2013.01); *G10L 15/30* (2013.01); *G10L 15/32* (2013.01);
(Continued)

(58) Field of Classification Search
CPC ......... G10L 15/02; G10L 15/22; G10L 15/30; G10L 15/32; G10L 21/0224; G10L 21/0264; G10L 25/09; G10L 25/21
See application file for complete search history.

(56) References Cited

U.S. PATENT DOCUMENTS

| 4,087,632 A | 5/1978 | Hafer |
| 4,209,843 A | 6/1980 | Hyatt |

(Continued)

FOREIGN PATENT DOCUMENTS

| CN | 203882609 U | 10/2001 |
| WO | 2012158938 A1 | 11/2012 |

OTHER PUBLICATIONS

Boser et al., "The Design of Sigma-Delta Modulation Analog-to-Digital Converters", J. Solid State Circ., vol. 23, No. 6 (IEEE, Dec. 1988), pp. 1298-1308.
(Continued)

*Primary Examiner* — Eric Yen
(74) *Attorney, Agent, or Firm* — Frank D. Cimino

(57) ABSTRACT

A sound recognition system including time-dependent analog filtered feature extraction and sequencing. An analog front end (AFE) in the system receives input analog signals, such as signals representing an audio input to a microphone. Features in the input signal are extracted, by measuring such attributes as zero crossing events and total energy in filtered versions of the signal with different frequency characteristics at different times during the audio event. In one embodiment, a tunable analog filter is controlled to change its frequency characteristics at different times during the event. In another embodiment, multiple analog filters with different filter characteristics filter the input signal in parallel, and signal features are extracted from each filtered signal; a multiplexer selects the desired features at different times during the event.

16 Claims, 5 Drawing Sheets

Related U.S. Application Data continuation of application No. 14/920,210, filed on Oct. 22, 2015, now Pat. No. 10,373,608.

(51) Int. Cl.

| | |
|---|---|
| *G10L 21/0224* | (2013.01) |
| *G10L 15/32* | (2013.01) |
| *G10L 15/22* | (2006.01) |
| *G10L 25/21* | (2013.01) |
| *G10L 25/09* | (2013.01) |
| *G10L 15/30* | (2013.01) |

(52) U.S. Cl.
CPC ...... *G10L 21/0224* (2013.01); *G10L 21/0264* (2013.01); *G10L 25/09* (2013.01); *G10L 25/21* (2013.01)

(56) References Cited

U.S. PATENT DOCUMENTS

| | | | |
|---|---|---|---|
| 4,292,469 A | 9/1981 | Scott et al. | |
| 4,340,798 A | 7/1982 | Ueda et al. | |
| 4,401,851 A | 8/1983 | Nitta et al. | |
| 4,535,473 A | 8/1985 | Sakata | |
| 4,544,919 A | 10/1985 | Gerson | |
| 4,592,074 A | 5/1986 | Whikehart | |
| 4,712,242 A | 12/1987 | Rajasekaran et al. | |
| 4,780,906 A | 10/1988 | Rajasekaran et al. | |
| 5,027,405 A | 6/1991 | Ozawa | |
| 5,313,531 A | 5/1994 | Jackson | |
| 5,343,496 A | 8/1994 | Honig et al. | |
| 5,444,741 A | 8/1995 | Mahieux | |
| 5,519,807 A | 5/1996 | Cellario et al. | |
| 5,532,936 A | 7/1996 | Perry | |
| 5,680,508 A | 10/1997 | Liu | |
| 5,953,700 A | 9/1999 | Kanevsky et al. | |
| 6,078,880 A | 6/2000 | Zinser, Jr. et al. | |
| 6,098,038 A | 8/2000 | Hermansky et al. | |
| 6,349,277 B1 | 2/2002 | Kamai et al. | |
| 6,470,311 B1 | 10/2002 | Moncur | |
| 6,931,292 B1 | 8/2005 | Brumitt et al. | |
| 7,315,815 B1 | 1/2008 | Gersho et al. | |
| 7,418,379 B2 | 8/2008 | Vierthaler | |
| 7,457,757 B1 | 11/2008 | McNeill et al. | |
| 7,460,024 B1 | 12/2008 | Ma et al. | |
| 7,535,859 B2 | 5/2009 | Brox | |
| 7,676,043 B1 | 3/2010 | Tsutsui et al. | |
| 7,714,854 B2 * | 5/2010 | Kim ................. G09G 3/3611 345/98 |
| 9,721,574 B2 | 8/2017 | Chatlani et al. | |
| 2001/0029449 A1 | 10/2001 | Tsurufuji et al. | |
| 2001/0033196 A1 | 10/2001 | Lennous et al. | |
| 2002/0027517 A1 | 3/2002 | Gata et al. | |
| 2002/0116196 A1 | 8/2002 | Tran | |
| 2002/0173950 A1 | 11/2002 | Vierthaler | |
| 2003/0156711 A1 | 8/2003 | Takahashi et al. | |
| 2003/0177012 A1 | 9/2003 | Drennan | |
| 2004/0013276 A1 | 1/2004 | Ellis et al. | |
| 2005/0231396 A1 | 10/2005 | Dunn | |
| 2006/0145772 A1 | 7/2006 | Xiu et al. | |
| 2006/0192618 A1 | 8/2006 | Al-Shyoukh et al. | |
| 2006/0288394 A1 | 12/2006 | Thomas et al. | |
| 2007/0191976 A1 | 8/2007 | Ruokangas et al. | |
| 2007/0282601 A1 | 12/2007 | Li | |
| 2008/0270126 A1 | 10/2008 | Jung et al. | |
| 2009/0119111 A1 | 5/2009 | Goto et al. | |
| 2009/0147968 A1 | 6/2009 | Inoda et al. | |
| 2009/0192802 A1 | 7/2009 | Nagaraja et al. | |
| 2009/0234645 A1 | 9/2009 | Bruhn | |
| 2009/0299742 A1 * | 12/2009 | Toman ................. G10L 21/0208 704/E15.039 |
| 2010/0119020 A1 | 5/2010 | Bhukania et al. | |
| 2010/0119082 A1 | 5/2010 | Kondo | |
| 2010/0174535 A1 | 7/2010 | Vos et al. | |
| 2011/0126624 A1 | 6/2011 | Thomas | |
| 2011/0137646 A1 | 6/2011 | Ahgren et al. | |
| 2012/0101813 A1 | 4/2012 | Vaillancourt et al. | |
| 2012/0116755 A1 | 5/2012 | Park | |
| 2013/0121508 A1 | 5/2013 | Vaillancourt et al. | |
| 2014/0316778 A1 | 10/2014 | Venkatesha et al. | |
| 2015/0055498 A1 | 3/2015 | Ma et al. | |
| 2015/0063575 A1 | 3/2015 | Tan | |
| 2015/0066495 A1 | 3/2015 | Zhang et al. | |
| 2015/0066497 A1 | 3/2015 | Sun et al. | |
| 2015/0066498 A1 | 3/2015 | Ma et al. | |

OTHER PUBLICATIONS

English Translation of First Office Action for CN 201610922487.8, dated Mar. 30, 2021 (Year: 2021).

\* cited by examiner

TIME-BASED FREQUENCY TUNING OF ANALOG-TO-INFORMATION FEATURE EXTRACTION

CROSS-REFERENCE TO RELATED APPLICATIONS

This application is a continuation of prior U.S. application Ser. No. 16/452,760 filed Jun. 26, 2019, which is a continuation of prior U.S. application Ser. No. 14/920,210, filed Oct. 22, 2015, to Zhenyong Zhang, et al., titled "Time-Based Frequency Tuning of Analog-to-Information Feature Extraction," which are herein incorporated by reference in their entireties.

STATEMENT REGARDING FEDERALLY SPONSORED RESEARCH OR DEVELOPMENT

Not applicable.

BACKGROUND OF THE INVENTION

This invention is in the field of active sensing of audio inputs. Embodiments are directed to the detection of particular features in sensed audio.

Recent advancements in semiconductor manufacturing and sensor technologies have enabled new capabilities in the use of low power networks of sensors and controllers to monitor environments and control processes. These networks are being envisioned for deployment in a wide range of applications, including transportation, manufacturing, biomedical, environmental management, safety, and security. Many of these low power networks involve machine-to-machine ("M2M") communications over a wide-area network, such a network now often referred to as the "Internet of Things" ("IoT").

The particular environmental attributes or events that are contemplated to serve as input to sensors in these networks are also wide-ranging, including conditions such as temperature, humidity, seismic activity, pressures, mechanical strain or vibrations, and so on. Audio attributes or events are also contemplated to be sensed in these networked systems. For example, in the security context, sensors may be deployed to detect particular sounds such as gunshots, glass breaking, human voices, footsteps, automobiles in the vicinity, animals gnawing power cables, weather conditions, and the like.

The sensing of audio signals or inputs is also carried out by such user devices as mobile telephones, personal computers, tablet computers, automobile audio systems, home entertainment or lighting systems, and the like. For example, voice activation of a software "app" is commonly available in modern mobile telephone handsets. Conventional voice activation typically operates by detecting particular features or "signatures" in sensed audio, and invoking corresponding applications or actions in response. Other types of audio inputs that can be sensed by these user devices include background sound, such as whether the user is an office environment, restaurant, in a moving automobile or other conveyance, in response to which the device modifies its response or operation.

Low power operation is critical in low-power network devices and in battery-powered mobile devices, to allow for maximum flexibility and battery life, and minimum form factor. For example, it has been observed that some types of sensors, such as wireless environmental sensors deployed in the IoT context, can use a large fraction of their available power on environmental or channel monitoring while waiting for an anticipated event to occur. This is particularly true for acoustic sensors, considering the significant amount of power typically required in voice and sound recognition. Conventional sensors of this type typically operate according to a low power, or "sleep," operating mode in which the back end of the sensor assembly (e.g., the signal transmitter circuitry) is effectively powered down pending receipt of a signal indicating the occurrence of the anticipated event. While this approach can significantly reduce power consumption of the sensor assembly, many low duty cycle systems in which each sensor assembly spends a very small amount of time performing data transmission still consume significant power during idle periods, so much so as to constitute a major portion of the overall power budget.

FIG. 1 illustrates a typical conventional sound recognition system 300, for example as applied to the detection of human speech. Sounds 310 from the surrounding environment are received by microphone 312 of recognition system 300, and are converted to an analog signal. Analog to digital converter (ADC) 322 in analog front end (AFE) stage 320 of system 300 converts this analog input signal to a digital signal, specifically in the form of a sequence of digital samples 324. As fundamental in the art, the sampling rate of ADC 322 exceeds the Nyquist rate of twice the maximum frequency of interest. For typical human speech recognition systems for which sound signals of up to about 20 kHz are of interest, the sample rate will be at least 40 kHz.

Digital logic 330 of system 300 converts digital samples 324 to sound information (D2I) in this conventional system 300. Digital logic 330 is typically realized by a general purpose microcontroller units (MCU), a specialty digital signal processor (DSP), an application specific integrated circuit (ASIC), or another type of programmable logic, and in this arrangement partitions the samples into frames 340 and then transforms 342 the framed samples into information features using a defined transform function 344. These information features are then mapped to sound signatures (I2S) by pattern recognition and tracking logic 350.

Recognition logic 350 is typically implemented by one or more types of known pattern recognition techniques, such as a Neural Network, a Classification Tree, Hidden Markov models, Conditional Random Fields, Support Vector Machine, etc., and operates in a periodic manner as represented by time points $t_0$ 360, $t_1$ 361, $t_2$ 362, etc. For example, each information feature (e.g., feature 346) generated by transformation 342 is compared to a database 370 of pre-identified features. At each time step, recognition logic 350 attempts to find a match between a sequence of information features produced by transformation logic 342 and a sequence of sound signatures stored in data base 370. Each candidate signatures 352 that is identified is assigned a score value indicating the degree of match between it and features in database 370. Those signatures 352 having a score for exceeding a threshold value, are identified by recognizer 300 as a match with a known signature.

Because the complex signal segmentation, signal transformation and final pattern recognition operations are performed in the digital domain in recognition system 300, high-performance and high-precision realizations of ADC 322 and the rest of analog-front-end (AFE) 320 are required to provide an adequate digital signal for the following complex digital processing. For example, audio recognition of a sound signal with an 8 kHz bandwidth by a typical conventional sound recognition system will require an ADC with 16-bit accuracy operating at a sample rate of 16 KSps (samples per second) or higher. In addition, because the raw input signal 310 is essentially recorded by system 300, that signal could potentially be reconstructed from stored data, raising privacy and security issues.

Furthermore, to mitigate the problem of high power consumption in battery powered applications, system 300 may be toggle between normal detection and standby operational modes at some duty cycle. For example, from time to time the whole system may be turned on and run in full-power mode for detection, followed by intervals in low-power standby mode. However, such duty cycled operation increases the possibility of missing an event during the standby mode.

By way of further background, U.S. Patent Application Publication No. US 2015/0066498, published Mar. 5, 2015, commonly assigned herewith and incorporated herein by this reference, describes a low power sound recognition sensor configured to receive an analog signal that may contain a signature sound. In this sensor, the received analog signal is evaluated using a detection portion of the analog section to determine when background noise on the analog signal is exceeded. A feature extraction portion of the analog section is triggered to extract sparse sound parameter information from the analog signal when the background noise is exceeded. An initial truncated portion of the sound parameter information is compared to a truncated sound parameter database stored locally with the sound recognition sensor to detect when there is a likelihood that the expected sound is being received in the analog signal. A trigger signal is generated to trigger classification logic when the likelihood that the expected sound is being received exceeds a threshold value.

By way of further background, U.S. Patent Application Publication No. US 2015/0066495, published Mar. 5, 2015, commonly assigned herewith and incorporated herein by this reference, describes a low power sound recognition sensor configured to receive an analog signal that may contain a signature sound. In this sensor, sparse sound parameter information is extracted from the analog signal and compared to a sound parameter reference stored locally with the sound recognition sensor to detect when the signature sound is received in the analog signal. A portion of the sparse sound parameter information is differential zero crossing (ZC) counts. Differential ZC rate may be determined by measuring a number of times the analog signal crosses a threshold value during each of a sequence of time frames to form a sequence of ZC counts and taking a difference between selected pairs of ZC counts to form a sequence of differential ZC counts.

BRIEF SUMMARY OF THE INVENTION

Disclosed embodiments provide an audio recognition system and method that efficiently identifies particular audio events with reduced power consumption.

Disclosed embodiments provide such a system and method that identifies particular audio events with improved accuracy.

Disclosed embodiments provide such a system and method that enables increased hardware efficiency, particularly in connection with analog circuitry and functions.

Disclosed embodiments provide such a system and method that can perform such audio recognition with higher frequency band resolution without increasing detection channel complexity.

Disclosed embodiments provide such a system and method that reduces analog filter mismatch in the audio recognition system.

Other objects and advantages of the disclosed embodiments will be apparent to those of ordinary skill in the art having reference to the following specification together with its drawings.

According to certain embodiments, analog audio detection is performed on a received audio signal by dividing the signal duration into multiple intervals, for example into frames. Analog signal features are identified from signals filtered with different frequency characteristics at different times in the signal, thus identifying signal features at particular frequencies at particular points in time in the input signal. An output feature sequence is constructed from the identified analog signal features, and compared with pre-defined feature sequences for the detected events.

DETAILED DESCRIPTION OF THE INVENTION

The one or more embodiments described in this specification are implemented into a voice recognition function, for example in a mobile telephone handset, as it is contemplated that such implementation is particularly advantageous in that context. However, it is also contemplated that concepts of this invention may be beneficially applied and implemented in other applications, for example in sound detection as may be carried out by remote sensors, security and other environmental sensors, and the like. Accordingly, it is to be understood that the following description is provided by way of example only, and is not intended to limit the true scope of this invention as claimed.

Figure 1:
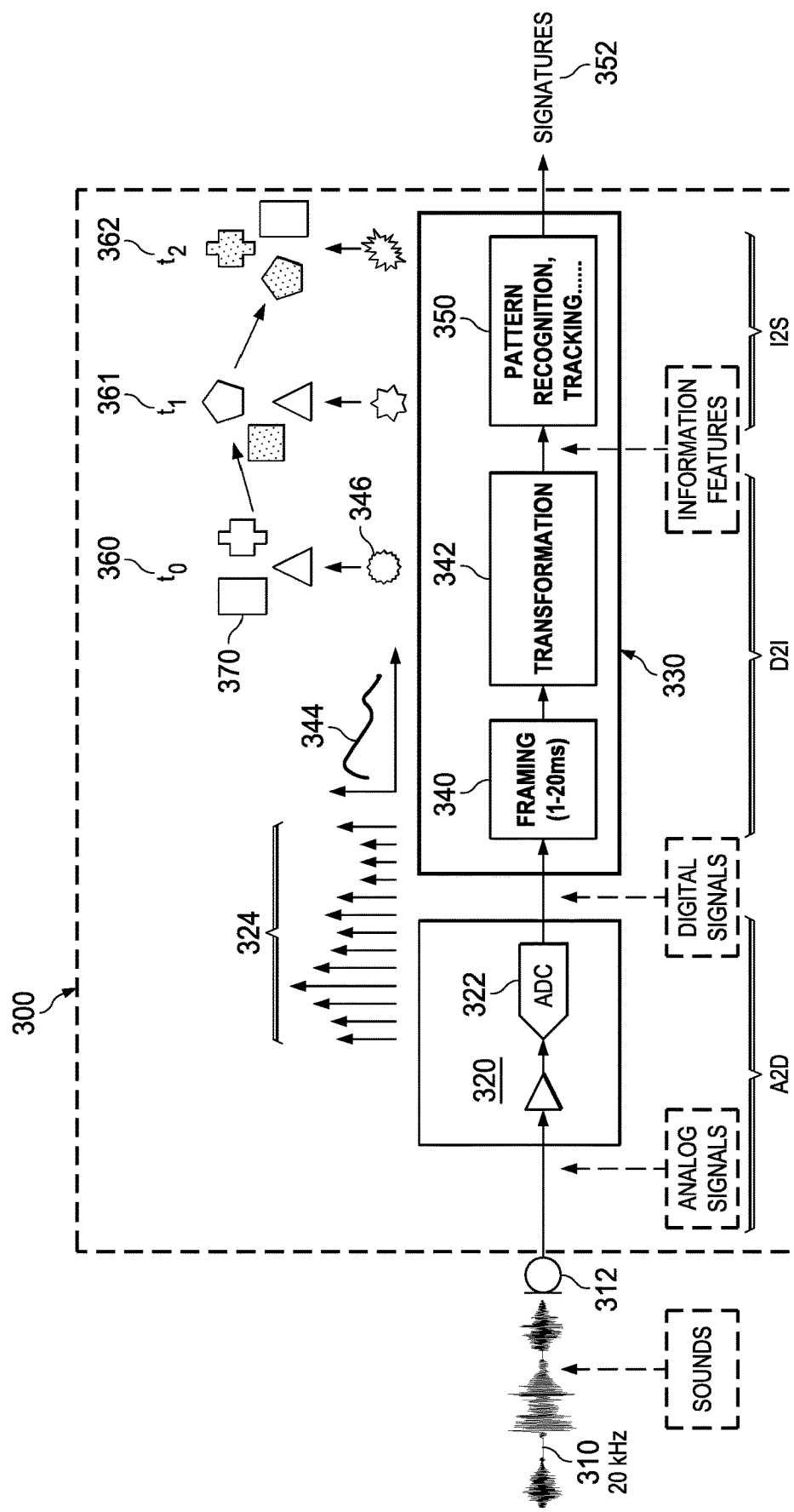
FIG. 1 is an electrical diagram, in block form, of a conventional audio recognition system.
Figure 2:
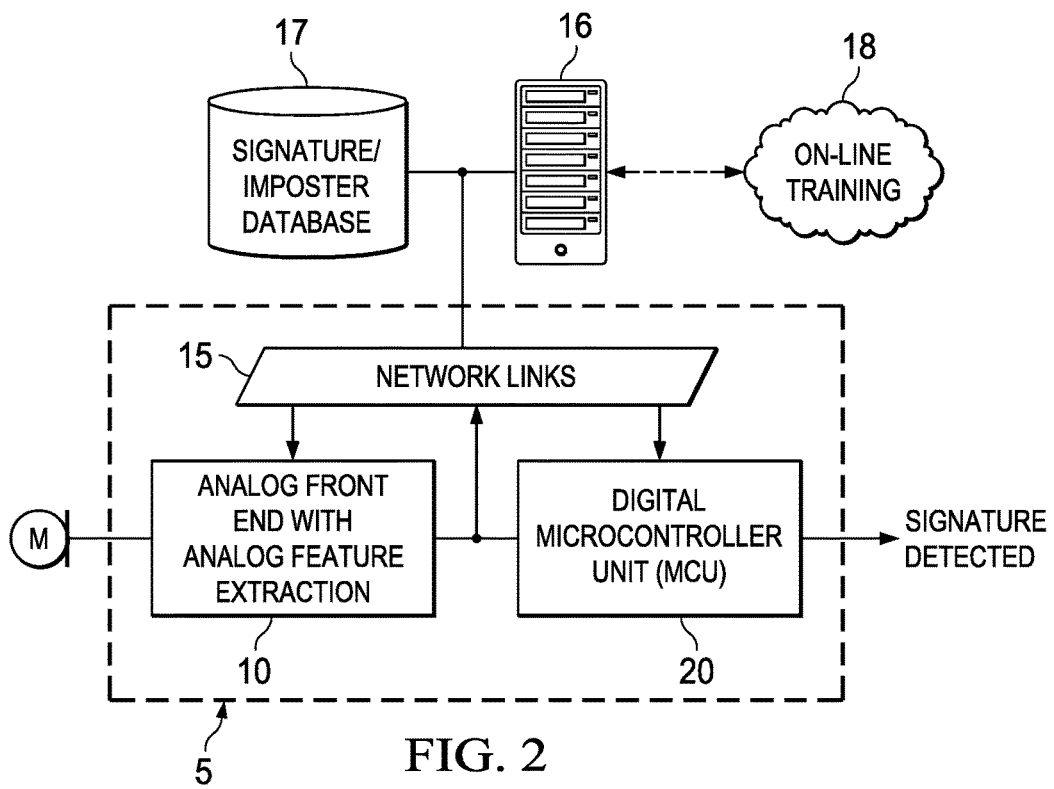
FIG. 2 is an electrical diagram, in block form, of an audio recognition system according to disclosed embodiments.

FIG. 2 functionally illustrates the architecture and operation of analog-to-information (A2I) sound recognition system 5, in which embodiments of this invention may be implemented. In this arrangement, as generally described in the above-incorporated U.S. Patent Application Publications No. US 2015/0066495 and No. US 2015/0066498, system 5 operates on sparse information extracted directly from an analog input signal, received by microphone M in this instance. According to this arrangement, analog front end (AFE) 10 both performs various forms of analog signal processing, such as the applying of analog filters with the desired frequency characteristics, framing of the filtered signals, and the like.

As will be described in further detail below in connection with these embodiments, AFE 10 also performs analog domain processing to extract particular features in the received input signal. These typically "sparse" extracted analog features are classified, for example by comparison with signature features stored in signature/imposter database 17, and then digitized and forwarded to digital microcontroller unit (MCU) 20, which may be realized by way of a general purpose microcontroller unit, specialty digital signal processor (DSP), application specific integrated circuit (ASIC), or the like. MCU 20 applies one or more type of known pattern recognition techniques, such as a Neural Network, a Classification Tree, Hidden Markov models, Conditional Random Fields, Support Vector Machine, and the like to carry out digital domain pattern recognition on the digitized features extracted by AFE 10 in this arrangement. Upon MCU 20 detecting a sound signature from those features, the corresponding information is forwarded from sound recognition system 5 to the appropriate destination function in the system in which system 5 is implemented, in the conventional manner. According to this arrangement, sound recognition system 5 only digitizes the extracted features, i.e. those features that contain useful and recognizable information, rather than the entire input signal, and performs digital pattern recognition based on those features, rather than a digitized version of the entire input signal. According to this arrangement, because the input sound is processed and framed in the analog domain, much of the noise and interference that may be present on a sound signal is removed prior to digitization, which in turn reduces the precision needed within AFE 10, particularly the speed and performance requirements for analog-to-digital conversion (ADC) functions within AFE 10. The resulting relaxation of performance requirements for AFE 10 enables sound recognition system 5 to operate at extremely low power levels, as is critical in modern battery-powered systems.

As shown in FIG. 2, AFE 10, and particularly its analog feature extraction functions, are capable of communication with an online implementation of signature/imposter database 17 to carry out its feature recognition functions. In this arrangement, sound recognition system 5 functionally includes network links 15, by way of which system 5 can communicate with server 16, which in turn accesses signature/imposter database 17 real-time during the recognition process for a received input signal. Alternatively, a local memory resource, within sound recognition system 5 or elsewhere in the end user system (e.g., mobile telephone handset) in which system 5 is implemented, may store the necessary data for local feature recognition within system 5. In this example, as shown in FIG. 2, it is contemplated that the data applied in the recognition of signal features may be developed via "cloud-based" online training 18, such as described in the above-incorporated U.S. Patent Application Publications No. US 2015/0066495 and No. US 2015/0066498, or in other conventional ways as known in the art.

Figure 3:
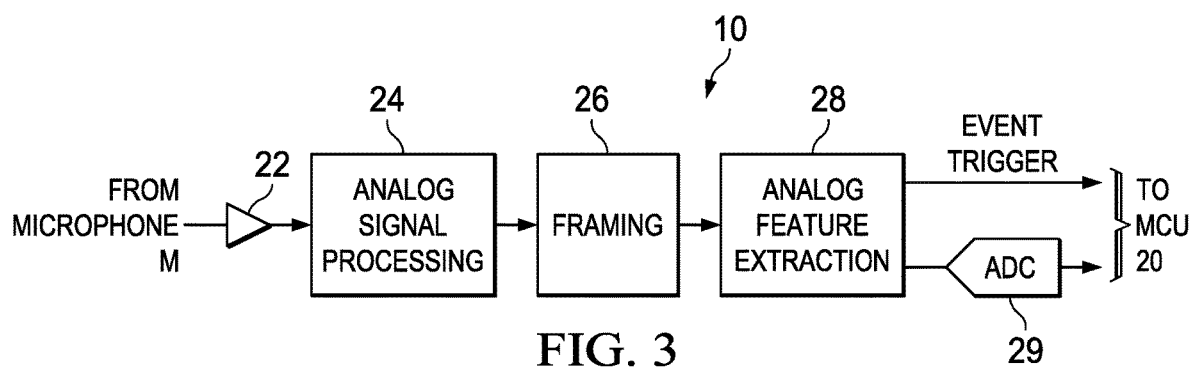
FIG. 3 is an electrical diagram, in block form, of an analog front end with analog feature extraction capability according to an embodiment.

FIG. 3 illustrates the functional arrangement of AFE 10 according to these embodiments. In this implementation, the analog signal received by microphone M is amplified by amplifier 22 and applied to analog signal processing circuitry 24 within analog front end 10. Signal processing circuitry 24 performs various forms of analog domain signal processing and conditioning, as appropriate for the downstream functions; it is contemplated those skilled in the art having reference to this specification will be readily able to realize analog signal processing function 24 as suitable for a particular implementation without undue experimentation. In this embodiment in which analog feature extraction is carried out on a frame-by-frame basis, analog framing function 26 separates the processed analog signal into time domain frames. The length of each frame may vary according to the particular application, with typical frame values ranging from about 1 msec to about 20 msec, for example. The processed analog signal frames are then forwarded to analog feature extraction function 28.

Figure 4:
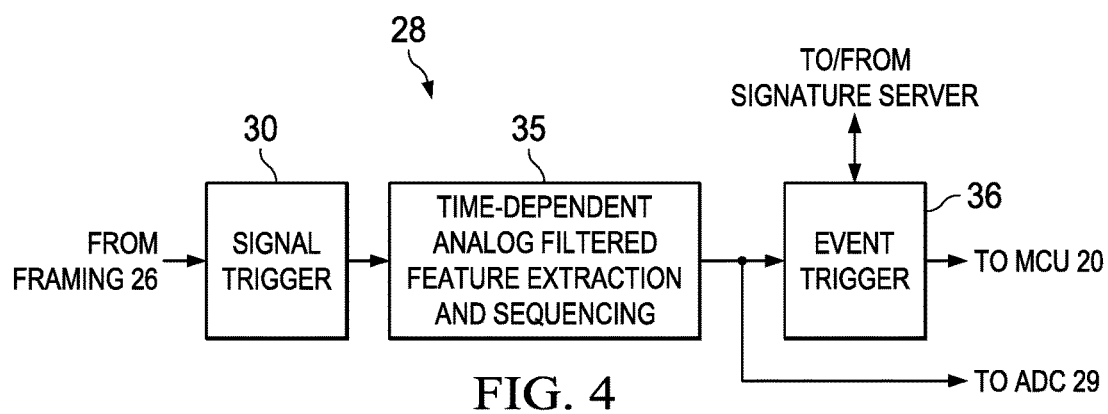
FIG. 4 is a functional diagram, in block form, of the analog feature extraction function in the analog front end of FIG. 3 according to an embodiment.

FIG. 4 illustrates the functional arrangement of analog feature extraction function 28 according to this embodiment. Signal trigger 30 is implemented as analog circuitry that evaluates the framed analog signals versus background noise to determine whether the functions in the following signal chain are to be awakened from a standby state, which allows much of the circuitry in AFE 10 to be powered-down much of the time. In the event that signal trigger 30 detects a certain amount of signal energy, for example by comparing an amplified version of the signal with an analog threshold, the framed analog signal is passed to time-dependent analog filtered feature extraction and sequencing function 35.

The above-incorporated U.S. Patent Application Publications No. US 2015/0066495 and No. US 2015/0066498 describe approaches to analog feature extraction in which multiple analog channels operate on the analog signal to extract different analog features. As described in those publications, one or more channels may extract such attributes as zero-crossing information and total energy from respective filtered versions of the analog input signal, using a selected band pass, low pass, high pass or other type of filter. The extracted features may be based on differential zero-crossing (ZC) counts, for example differences in ZC rate between adjacent sound frames (i.e., in the time-domain), determining ZC rate differences by using different threshold voltages instead of only one reference threshold (i.e., in the amplitude-domain); determining ZC rate difference by using different sampling clock frequencies (i.e., in the frequency-domain), with these and other differential ZC measures used individually or combined to recognize particular features. The total energy values extracted from the analog signal and various filtered versions of that signal can be analyzed to detect energy values in particular bands of frequencies, which can also indicate particular features.

Figure 5:
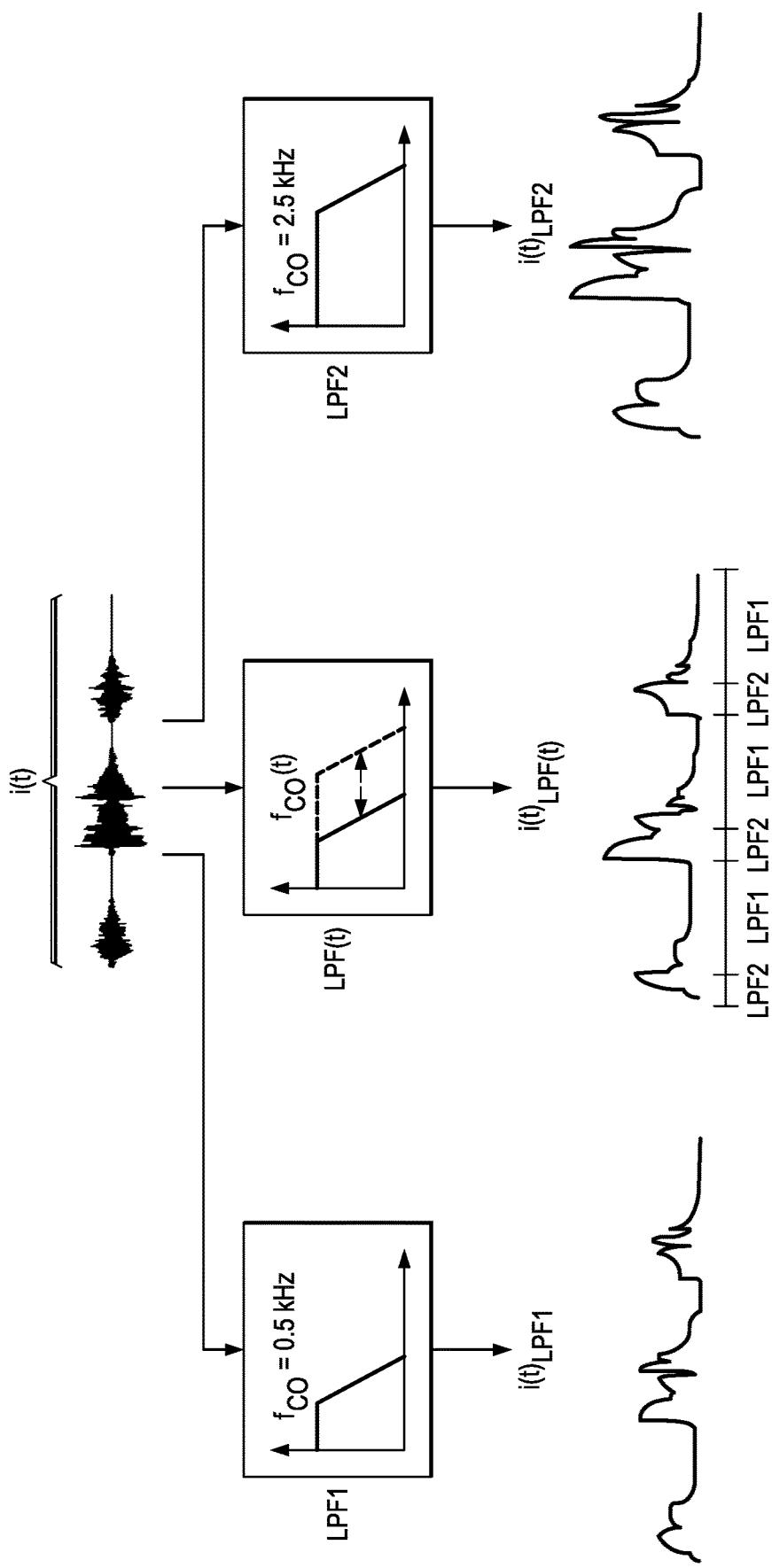
FIG. 5 illustrates plots of filtered signals, comparing a multi-channel filter approach with the operation of an embodiment.

According to the approaches in the above-incorporated U.S. Patent Application Publications No. US 2015/0066495 and No. US 2015/0066498, the analog feature extraction channels are applied over the duration of the received signal. FIG. 5 illustrates an illustrative example of the filtering applied by these various analog channels. In this example analog signal i(t) is an input signal received over time, such as over the duration of the sound event or over some number of frames. For example, if the expected sound event typically occurs within one second and the frames generated by framing function 26 are 20 msec in length, analog signal i(t) will have a duration of about fifty frames. In one analog feature extraction channel, low pass filter LPF1 filters this received analog signal i(t) with a low pass filter with a cutoff frequency $f_{CO}$ of 0.5 kHz, to produce filtered analog signal $i(t)_{LPF1}$ as shown. Similarly, in another feature extraction channel, low pass filter LPF2 applies a filter with a cutoff frequency $f_{CO}$ of 2.5 kHz to input signal i(t) to produce filtered analog signal $i(t)_{LPF2}$ as shown. According to the implementations described in the above-incorporated U.S. Patent Application Publications No. US 2015/0066495 and No. US 2015/0066498, each of these signals $i(t)_{LPF1}$ and $i(t)_{LPF2}$ is then analyzed by a feature extraction circuit, such as a zero crossing (ZC) counter, a differential ZC analyzer, an integrator to derive total energy, and the like, that determines the amplitude of a particular analog signal feature in the corresponding filtered signal $i(t)_{LFP1}$, $i(t)_{LPF2}$.

It has been discovered, in connection with this invention, that signal features in a particular frequency band at a particular time interval within the signal can be more important to signature recognition than features in other frequency bands during that interval, and more important than features in that same particular frequency band at other times in the signal. According to these embodiments, time-dependent analog filtered feature extraction and sequencing function 35 (FIG. 4) is provided so that the extraction of features in the signal can be performed with different frequency sensitivities at different times within the duration of the audio signal event.

It is contemplated that the particular sequence of filter frequency characteristics to be applied over the duration of the input signal will typically be determined by on-line training function 18 in its development of signature/imposter database 17. In general, this training will operate to identify the most unique features of the sound event to be detected, such as described in the above-incorporated U.S. Patent Application Publications No. US 2015/0066495 and No. US 2015/0066498, with the addition of the necessary training to identify the particular frequency bands and frame intervals at which those features occur within the signal. According to these embodiments, this training results in the determination of a sequence of filter frequency bands and corresponding signal features to be applied or detected, as the case may be, over the duration of the signal.

An example of the operation of time-dependent analog filtered feature extraction and sequencing function 35 according to these embodiments is illustrated in FIG. 5 by low pass filter LPF(t), which applies a filter with a time-dependent cutoff frequency $f_{CO}(t)$ to input signal i(t) to produce filtered input signal $i(t)_{LPF(t)}$. In this example, low pass filter LPF(t) applies low pass filter LPF2 with a cutoff frequency $f_{CO}$ of 2.5 kHz during the first frame in the input signal sequence and during two individual frames near the middle of the input signal sequence, and applies low pass filter LPF1 with a cutoff frequency $f_{CO}$ of 0.5 kHz during the other frames in the duration of input signal i(t). This pattern is useful if the desired sound signature to be detected has high energy at high frequencies early in the sound event (i.e., during the first frame) and also in two individual frames near the middle of the sound event at the times that low pass filter LPF2 is selected, and features at lower frequencies at other times in the event. Analog feature extraction is applied to these respective filtered signals at those intervals, by time-dependent analog filtered feature extraction and sequencing function 35, to produce a sequence of signal features over the duration of the input signal i(t). In this manner, time-dependent analog filtered feature extraction and sequencing function 35 enables the identification of signal features at different frequencies at different times in the signal interval, and thus improved precision in signature detection.

Figure 6A:
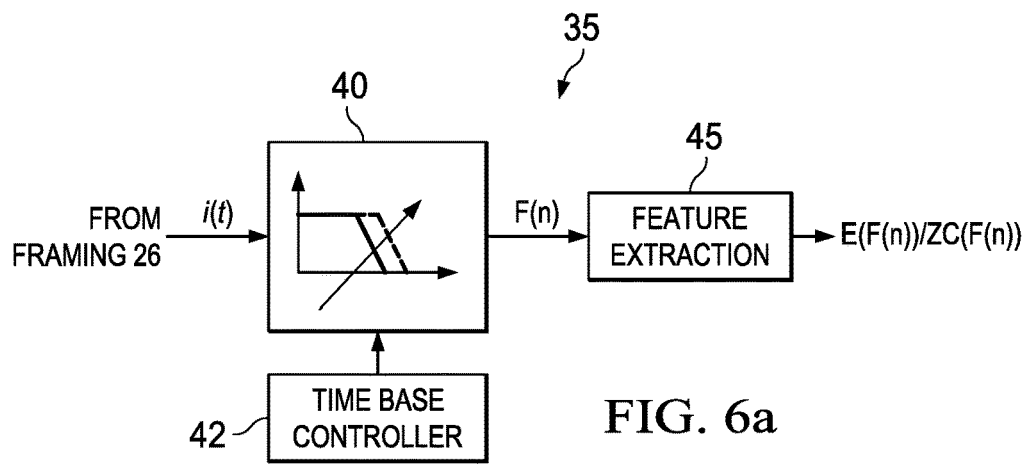
FIGS. 6a and 6b are electrical diagrams, in block form, of a time-dependent analog filtered feature extraction and sequencing functions according to alternative embodiments.

Referring to FIG. 6a, the construction and operation of time-dependent analog filtered feature extraction and sequencing function 35 according to an embodiment will now be described in further detail. In this embodiment, tunable filter 40 receives analog input signal i(t), and filters that signal according to a frequency characteristic that can vary with time over the duration of the signal. For example, tunable filter 40 may be constructed as an analog filter in which selected components (e.g., resistors, capacitors) may be switched into and out of the filter circuit in response to a digital control signal. In such an implementation, time base controller 42 includes the appropriate logic circuitry for generating the digital control signals that select the filter characteristic to be applied by tunable filter 40. In this embodiment of FIG. 4, for the example of analog input signal i(t) presented as a sequence of m frames, time base controller 42 issues the appropriate control signals to tunable filter 40 so that it applies a particular filter characteristic to input signal i(t) in each frame of the sequence of m frames. Examples of these filter characteristics include low-pass filters, band-pass filters, high-pass filters, notch filters, etc. with different cutoff frequencies, such as in the case of LPF1, LPF2 in the simplified example of FIG. 5. For example, time base controller 42 can control the selection of the applicable filter characteristic for tunable filter 40 from a set F={F1, F2, F3, . . . , FX} of available filter characteristics for each of the m frames, such that the selected filter characteristic applied in a given frame n is a member of that set, i.e. F(n)∈F. Of course, successive frames may apply the same filter characteristic, for example as shown in FIG. 5 by the longer interval over which low-pass filter LPF1 is applied.

As noted above, the sequence of filter characteristics selected by time base controller 42 over the sequence of m frames can be pre-defined based on the result of on-line training function 18, or otherwise corresponding to the pre-known feature sequence in signature/imposter database 17 for the sound signature to be detected.

According to this embodiment, therefore, a sequence of framed filtered analog signals F(n), each filtered according to a filter characteristic that may vary among the frames of the sequence of m frames, is provided by tunable filter 40 to feature extraction function 45. Feature extraction function 45 is constructed to extract one or more features from the filtered signal in each frame. For example, as described in the above-incorporated U.S. Patent Application Publications No. US 2015/0066495 and No. US 2015/0066498, feature extraction function 45 may be constructed to extract features such as ZC counts, ZC differentials, total energy, and the like. It is contemplated that those skilled in the art having reference to this specification along with the above-incorporated U.S. Patent Application Publications No. US 2015/0066495 and No. US 2015/0066498 will be readily able to realize the zero-crossing circuitry, integrator circuitry, and the like for extracting the desired features from the signal F(n) produced by tunable filter 40 according to this embodiment, without undue experimentation. Feature extraction function 45 thus produces a frame by frame sequence E(F(n))/ZC(F(n)) of the extracted features, where those features are extracted from particular frequencies of the input signal at various times within the duration of the signal.

This sequence E(F(n))/ZC(F(n)) of extracted features is then provided to event trigger 36 in analog feature extraction function 28, as shown in FIG. 4. Similarly as described in the above-incorporated U.S. Patent Application Publications No. US 2015/0066495 and No. US 2015/0066498, event trigger 36 is implemented as logic that compares the sequence E(F(n))/ZC(F(n)) of extracted features to a pre-defined feature sequence, and based on that comparison decides whether a digital classifier function in MCU 20 is to wake up to run full signature detection, as discussed above. According to this embodiment, event trigger 36 may rely on one or more analog signal features in the sequence E(F(n))/ZC(F(n)) to signal a starting point for comparison with known features, for example those known features determined by on-line training 18 or otherwise stored in signature/imposter database 17. Particular features (e.g., user-specific features) that are to be identified by this particular system 5 may be stored in a database of one or more sound signatures in memory internal to, or otherwise accessible by, event trigger 36 for use in this comparison so that the sequence E(F(n))/ZC(F(n)) of extracted features may be compared with the pre-defined feature sequence, for example over each of the time intervals (e.g., one or more frames) that a particular frequency characteristic was applied by tunable analog filter 40. Upon event trigger 36 detecting a likely match according to a matching criterion, for example by some measure of a comparison of the identified feature sequence E(F(n))/ZC(F(n)) with the pre-defined known features exceeding a threshold value, event trigger 36 asserts a signal that initiates an action by digital processing circuitry, such as a trigger signal that causes MCU 20 to awaken and cause its digital classification logic to perform a rigorous sound recognition process on the sparse sound features extracted by analog feature extraction function 28. In this embodiment, the feature sequence E(F(n))/ZC(F(n)) is itself forwarded to ADC 29 for digitization and forwarding to MCU 20 for this rigorous digital sound recognition task; alternatively, the received analog signal itself (i.e., not filtered according to the time-dependent filtering of tunable analog filter 40) may instead be forwarded to ADC 29 so that the digital sound recognition is performed on the full signal.

Figure 6B:
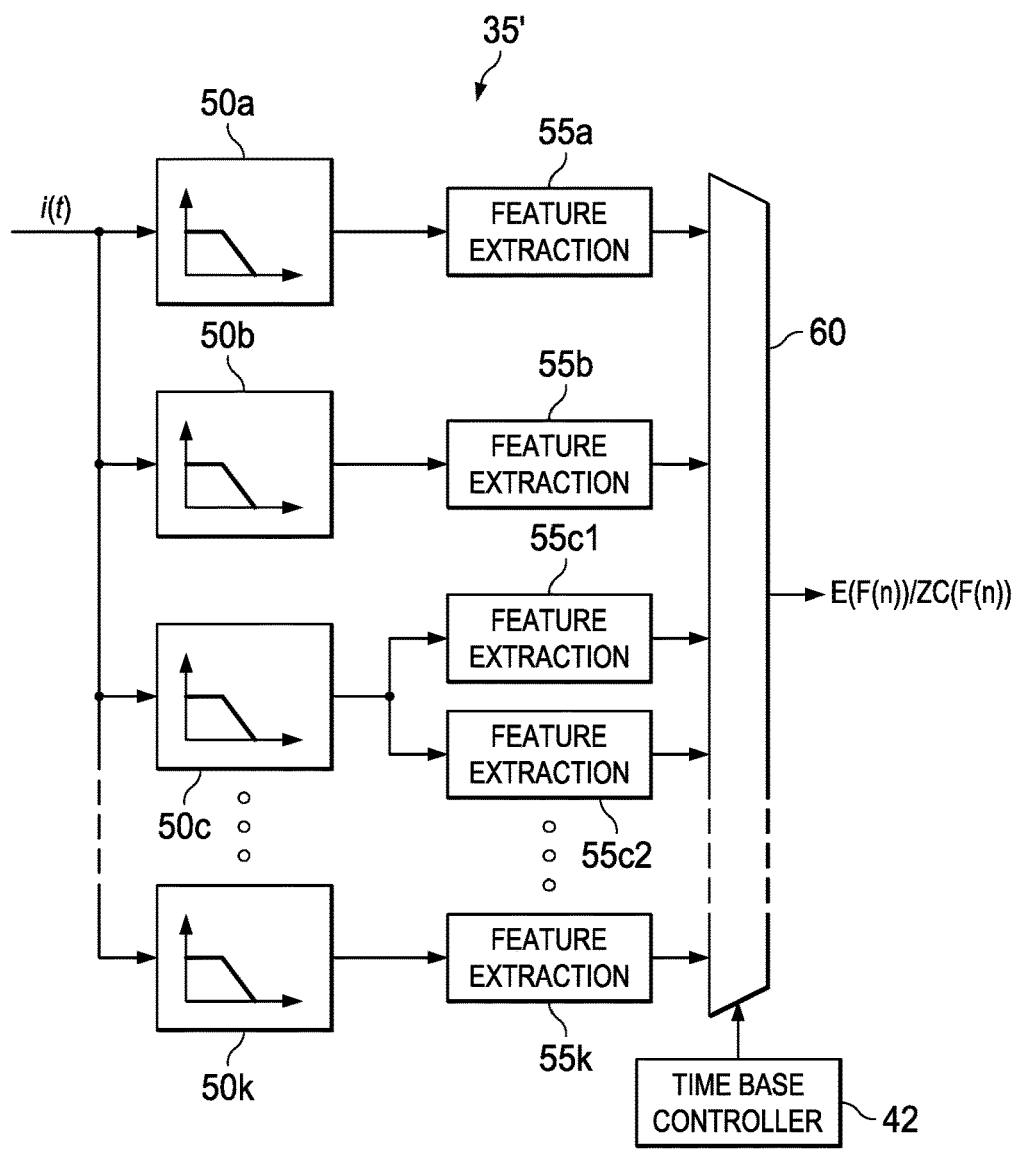

Referring to FIG. 6b, the construction and operation of time-dependent analog filtered feature extraction and sequencing function 35' according to another embodiment will now be described in further detail. In this arrangement, rather than a tunable analog filter, extraction and sequencing function 35' includes a bank of analog filters 50a, 50b, ..., 50k that each receive and filter input signal i(t) over its entire duration. According to this embodiment, however, analog filters 50a through 50k apply different filter characteristics to input signal i(t) from one another; while FIG. 6b illustrates each of analog filters 50a through 50k by a low-pass filter indication, the filter characteristics applied by these filters are of course not limited to low-pass filters. Examples of the filter characteristics that may be applied by individual ones of analog filters 50a through 50k include low-pass filters, band-pass filters, high-pass filters, notch filters, etc. with different cutoff frequencies such as in the case of LPF1, LPF2 in the simplified low-pass filter example of FIG. 5.

The filtered signals produced by analog filters 50a through 50k are then applied to corresponding feature extraction functions 55a, 55b, ..., 55k, which are constructed to extract one or more features from the corresponding filtered signal. It is contemplated that feature extraction functions 55a through 55k may be constructed similarly as feature extraction function 45 described above and in the above-incorporated U.S. Patent Application Publications No. US 2015/0066495 and No. US 2015/0066498, with each instance extracting features such as ZC counts, ZC differentials, total energy, and the like. It is contemplated that those skilled in the art having reference to this specification along with the above-incorporated U.S. Patent Application Publications No. US 2015/0066495 and No. US 2015/0066498 will be readily able to realize feature extraction functions 55a through 55k, in the form of zero-crossing circuitry, integrator circuitry, and the like, as appropriate for extracting the desired features from the filtered signals from corresponding analog filters 50a through 50k, without undue experimentation. It is contemplated that the filtered output from one or more of analog filters 50a through 50k may be presented to more than one corresponding feature extraction function 55a through 55k. For example, as shown in FIG. 6b, the filtered signal from analog filter 50c is applied to two feature extraction functions 55c1, 55c2; these functions 55c1, 55c2 may be arranged to extract different features from the filtered signal, for example with function 55c1 extracting a total energy and function 55c2 extracting a ZC count or differential, etc.

According to this embodiment, in which the multiple analog filters 50a through 50k may each be enabled to filter input signal i(t) over its entire duration, the outputs of each of feature extraction functions 55a through 55k are applied to corresponding inputs of multiplexer 60. The output of multiplexer 60 presents the feature sequence E(F(n))/ZC(F(n)) to trigger logic 36 and ADC 29 (FIG. 4) as described above. In this embodiment, multiplexer 60 is constructed to select one or more of the extracted features from feature extraction functions 55a through 55k, in response to a control signal from time base controller 42. Similarly as described above relative to FIG. 6a, time base controller 42 includes the appropriate logic circuitry for generating the control signals that cause multiplexer 60 to select the appropriate extracted features at the desired frames or time intervals within the duration of input signal i(t). In the embodiment of FIG. 4 in which analog input signal i(t) is presented as a sequence of m frames, time base controller 42 issues the appropriate control signals to multiplexer 60 so that it selects one or more of the extracted features feature extraction functions 55a through 55k in each frame of the sequence of m frames. In this manner, the output of multiplexer 60 produces a frame by frame sequence E(F(n))/ZC(F(n)) of the extracted features, where those features are extracted from particular frequencies of the input signal at various times within the duration of the signal.

As in the embodiment of FIG. 6a, the sequence E(F(n))/ZC(F(n)) of extracted features is then provided by multiplexer 60 of time-dependent analog filtered feature extraction and sequencing function 35' to event trigger 36 in analog feature extraction function 28 (FIG. 4). As described above, event trigger 36 compares the sequence E(F(n))/ZC(F(n)) of extracted features to a pre-defined feature sequence, and based on that comparison and an applicable matching criterion, as described above relative to FIG. 6a, decides whether a digital classifier function in MCU 20 is to wake up to run full signature detection. If so, trigger logic 130 asserts a signal that initiates an action on the part of downstream circuitry, for example a signal that causes MCU 20 to awaken and cause its digital classification logic to perform a rigorous sound recognition process on the sparse sound features extracted by analog feature extraction function 28. Either the feature sequence E(F(n))/ZC(F(n)) itself is forwarded to ADC 29 for digitization and forwarding to MCU 20 for this rigorous digital sound recognition task, or the received analog signal itself from which the features were extracted by time-dependent analog filtered feature extraction and sequencing function 35' is forwarded to ADC 29 for digitization and digital sound recognition by MCU 20.

Figure 7:
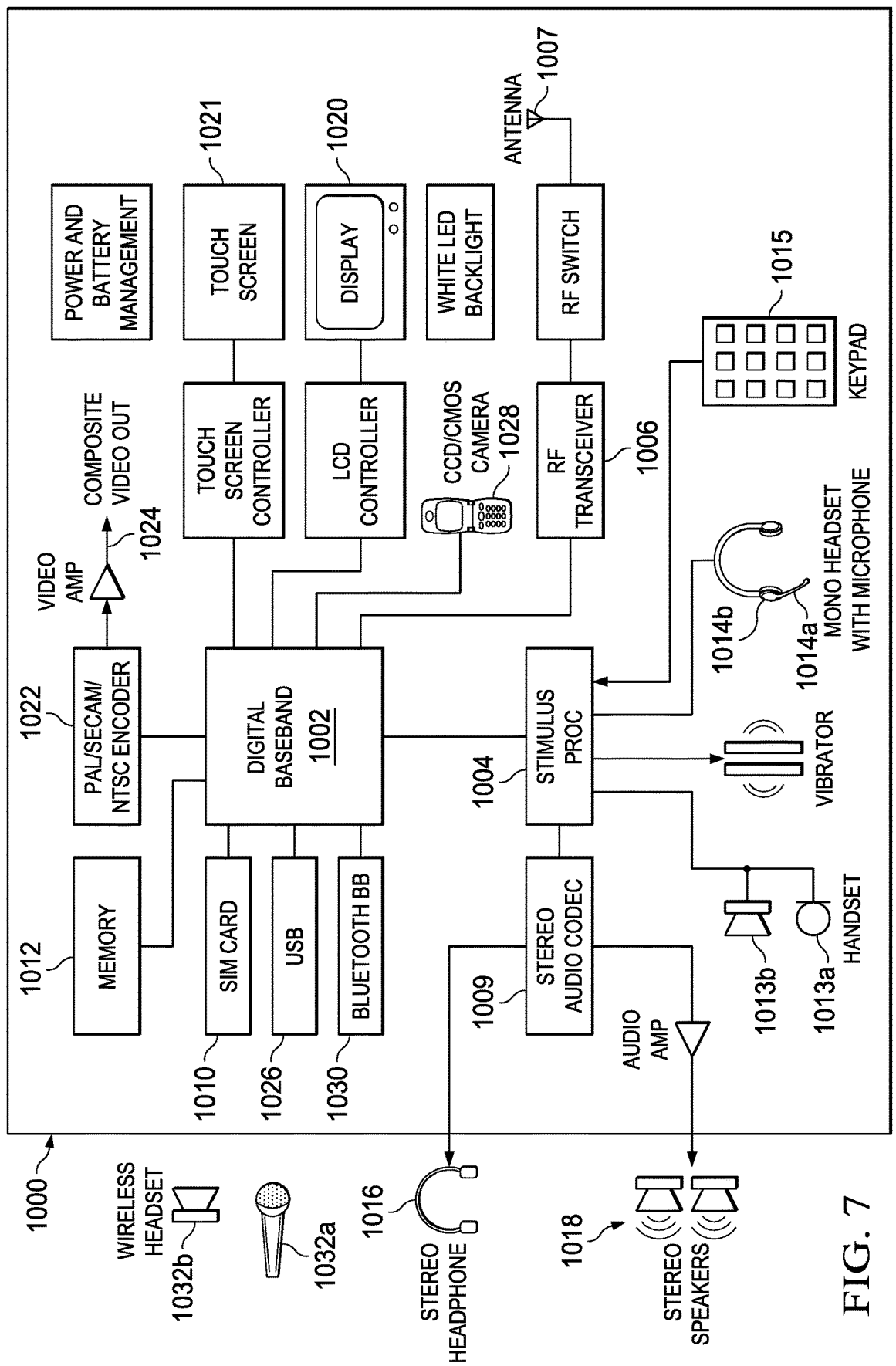
FIG. 7 is an electrical diagram, in block form, of a system that utilizes A2I sparse sound features for sound recognition according to disclosed embodiments.

FIG. 7 is a block diagram of example mobile cellular phone 1000 that utilizes A2I sparse sound features according to these embodiments, such as for command recognition. Digital baseband (DBB) unit 1002 may include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc. being setup by software running on the DBB. In an alternate embodiment, SP processing is performed on the same processor that performs DBB processing. In another embodiment, a separate DSP or other type of processor performs SP processing.

In this implementation, SP unit 1004 includes an A2I sound extraction module in the form of sound recognition system 5 described above, which allows mobile phone 1000 to operate in an ultralow power consumption mode while continuously monitoring for a spoken word command or other sounds that may be configured to wake up mobile phone 1000. Robust sound features may be extracted and provided to digital baseband module 1002 for use in classification and recognition of a vocabulary of command words that then invoke various operating features of mobile phone 1000. For example, voice dialing to contacts in an address book may be performed. Robust sound features may be sent to a cloud based training server via RF transceiver 1006, as described in more detail above.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

The analog filtered feature extraction and sequencing function according to this embodiment provides important benefits in the recognition of audio events, commands, and the like. One such benefit resulting from the analog feature extraction according to these embodiments is reduction in the complexity of the downstream digital sound recognition process. Rather than receiving and processing multiple analog feature sequences processed by multiple analog channels, these embodiments can present a single sequence of extracted features, which allows the digital classifier to be significantly less complex. These embodiments also improve the potential frequency band resolution of the sound recognition process over fixed frequency band implementations, in which the frequency band resolution is proportional to the channel count. In these embodiments, different frequency bands can be assigned to certain time intervals of the input signal, allowing a single channel to attain good resolution over multiple frequencies. This attribute of these embodiments also improves the overall accuracy and efficiency of the sound recognition process, by allowing the training process to extract the most unique features of the audio event to be detected, isolated in both time and frequency, which reduces the computational work for recognizing a signature while improving the accuracy of the recognition.

Some of the embodiments described above provide hardware efficiency and improved hardware performance. More specifically, the use of a tunable analog filter that applies different frequency characteristics at different times during the signal duration reduces the number of analog filters and also the number of feature extraction functions in the analog front end from the multi-channel approach. In addition, embodiments that use the tunable analog filter eliminate the potential for filter mismatch among multiple filters operating in parallel; rather, many of the same circuit elements are used to apply the multiple filter characteristics at different times.

It is contemplated that those skilled in the art having reference to this specification will recognize variations and alternatives to the described embodiments, and it is to be understood that such variations and alternatives are intended to fall within the scope of the claims. For example, while these embodiments perform the analog filtering and feature extraction after framing of the input analog signal, it is contemplated that framing could alternatively be performed after feature extraction and recognition. In addition, other embodiments may include other types of analog signal processing circuits that may be tailored to extraction of sound information that may be useful for detecting a particular type of sound, such as motor or engine operation, electric arc, car crashing, breaking sound, animal chewing power cables, rain, wind, etc. It is contemplated that those skilled in the art having reference to this specification can readily implement and realize such alternatives, without undue experimentation.

While one or more embodiments have been described in this specification, it is of course contemplated that modifications of, and alternatives to, these embodiments, such modifications and alternatives capable of obtaining one or more the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method comprising:
   receiving, by a first filter, an analog signal having a plurality of frames, wherein the first filter includes a first frequency response;
   receiving, by a second filter, the analog signal, wherein the second filter includes a second frequency response different than the first frequency response;
   filtering, by the first filter, the analog signal to produce a first filtered signal;
   filtering, by the second filter, the analog signal to produce a second filtered signal;

receiving, by each of a plurality of feature extraction circuits, one of the first filtered signal and the second filtered signal;

outputting, by each of the plurality of feature extraction circuits, respective outputs; and selecting, by a multiplexer in response to a selection signal, one of the respective outputs for each frame of a subset of the plurality of frames to output a feature sequence.

2. The method of claim 1, wherein:

the plurality of feature extraction circuits includes a first feature extraction circuit, a second feature extraction circuit, and a third feature extraction circuit;

the respective outputs include a first feature extraction output associated with the first feature extraction circuit, a second feature extraction output associated with the second feature extraction circuit, and a third feature extraction output associated with the third feature extraction circuit;

selecting, by the multiplexer in response to the selection signal, one of the respective outputs includes selecting the first feature extraction output at a first frame to output a first feature in the feature sequence;

selecting, by the multiplexer in response to the selection signal, one of the respective outputs includes selecting the second feature extraction output at a second frame to output a second feature in the feature sequence subsequent to the first feature; and selecting, by the multiplexer in response to the selection signal, one of the respective outputs includes selecting one of the first feature extraction output and the second feature extraction output at a third frame to output a third feature in the feature sequence subsequent to the second feature.

3. The method of claim 1, wherein:

a time base controller issues the selection signal.

4. The method of claim 1, wherein:

the filtering, by the first filter, and the filtering, by the second filter, occur in parallel.

5. The method of claim 1, further comprising:

performing, by an analog-to-digital converter, analog-to-digital conversion of the feature sequence to form a digitized feature sequence.

6. The method of claim 1, further comprising:

receiving, by an event trigger, the feature sequence.

7. The method of claim 6, further comprising:

comparing, by a processor, the feature sequence with a pre-defined feature sequence; and in response to the comparing indicating a match, wake up the processor.

8. The method of claim 7, further comprising:

in response to the processor waking up, performing, by the processor, a sound recognition process on the analog signal.

9. A circuit comprising:

a first filter configured to:

receive an analog signal having a plurality of frames, wherein the first filter includes a first frequency response; and filter the analog signal to produce a first filtered signal;

a second filter configured to:

receive the analog signal, wherein the second filter includes a second frequency response different than the first frequency response; and filter the analog signal to produce a second filtered signal;

a plurality of feature extraction circuits configured to:

receive one of the first filtered signal and the second filtered signal; and output respective outputs; and a multiplexer configured to select, in response to a selection signal, one of the respective outputs for each frame of a subset of the plurality of frames to output a feature sequence.

10. The circuit of claim 9, wherein:

the plurality of feature extraction circuits includes a first feature extraction circuit, a second feature extraction circuit, and a third feature extraction circuit;

the respective outputs include a first feature extraction output associated with the first feature extraction circuit, a second feature extraction output associated with the second feature extraction circuit, and a third feature extraction output associated with the third feature extraction circuit;

the multiplexer is configured to select, in response to the selection signal, the first feature extraction output at a first frame to output a first feature in the feature sequence;

the multiplexer is configured to select, in response to the selection signal, the second feature extraction output at a second frame to output a second feature in the feature sequence subsequent to the first feature; and the multiplexer is configured to select, in response to the selection signal, one of the first feature extraction output and the second feature extraction output at a third frame to output a third feature in the feature sequence subsequent to the second feature.

11. The circuit of claim 9, wherein:

a time base controller issues the selection signal.

12. The circuit of claim 9, wherein:

the first filter and the second filter are configured to perform filtering in parallel.

13. The circuit of claim 9, further comprising:

an analog-to-digital converter configured to perform analog-to-digital conversion of the feature sequence to form a digitized feature sequence.

14. The circuit of claim 9, further comprising:

an event trigger configured to receive the feature sequence.

15. The circuit of claim 14, further comprising:

a processor configured to:

compare the feature sequence with a pre-defined feature sequence; and in response to the comparing indicating a match, enter into a full operational mode from a restricted operational mode.

16. The circuit of claim 15, wherein:

in response to the processor entering the full operational mode, the processor is configured to perform a sound recognition process on the analog signal.

* * * * *